S. LOE.
KEYBOARD MECHANISM FOR VOTING MACHINES.
APPLICATION FILED MAY 24, 1917.
1,304,580.
Patented May 27, 1919.
5 SHEETS—SHEET 1.
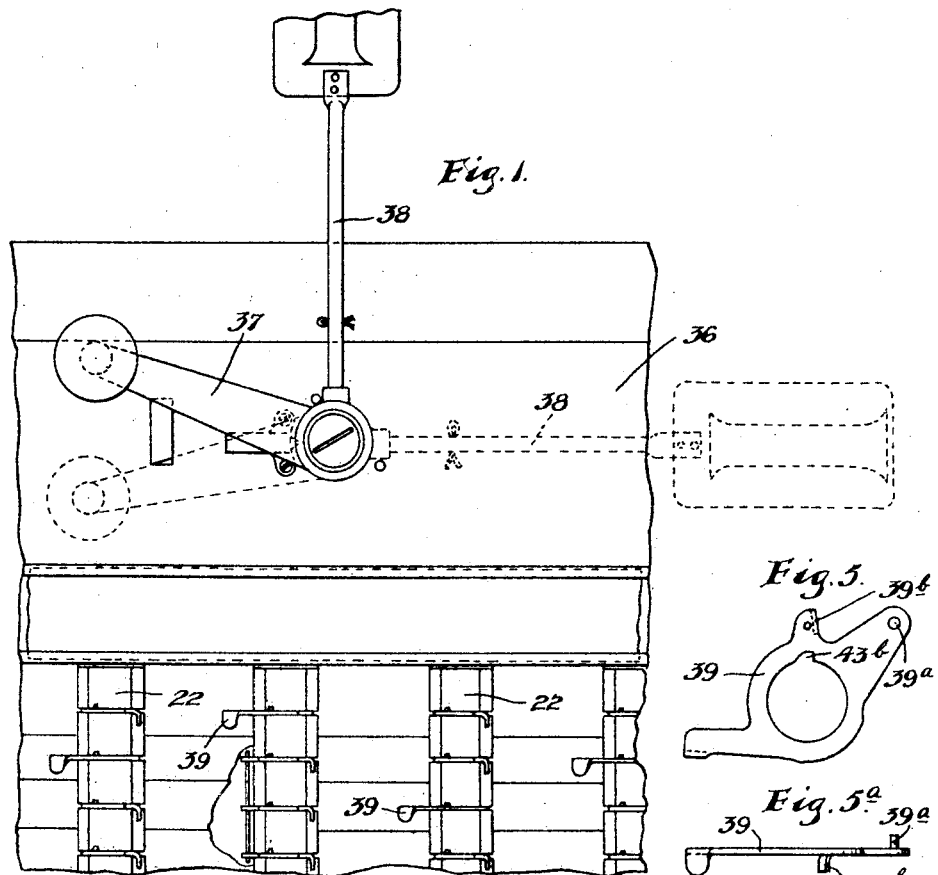
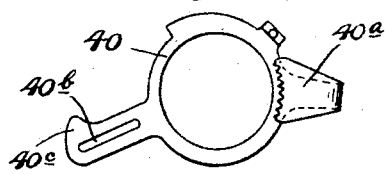
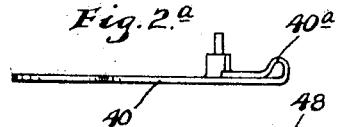
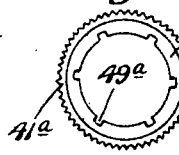
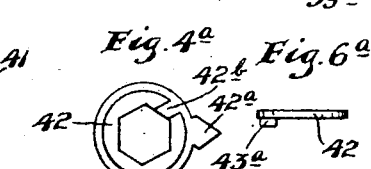
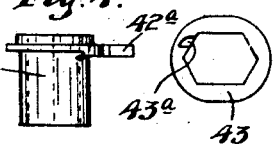
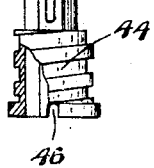
WITNESSES.
H. L. Opsahl.
E. C. Wells
INVENTOR.
SYVER LOE.
BY HIS ATTORNEYS S. LOE.
KEYBOARD MECHANISM FOR VOTING MACHINES.
APPLICATION FILED MAY 24, 1917.
1,304,580.
Patented May 27, 1919.
5 SHEETS—SHEET 2.
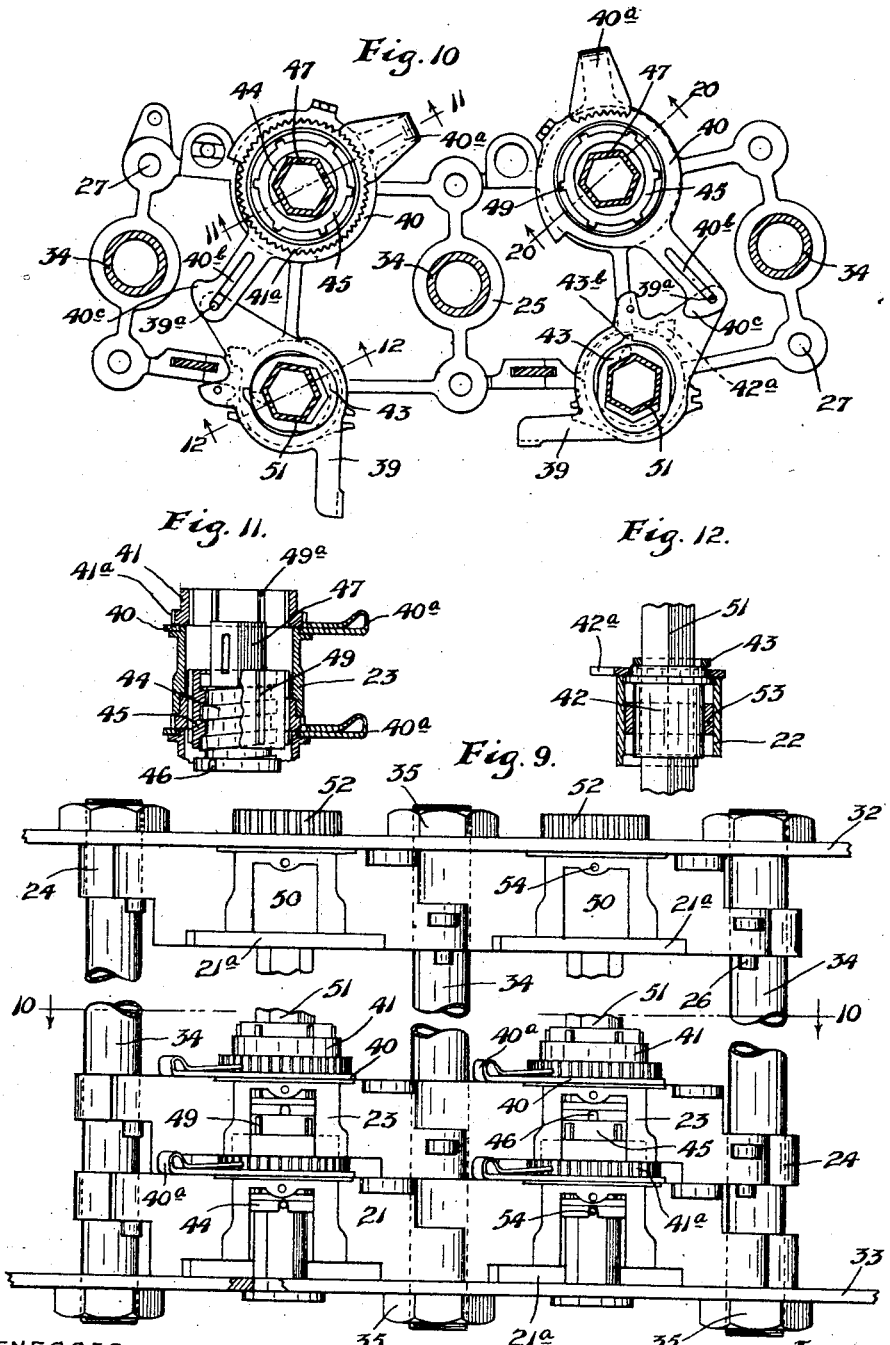

S. LOE.
KEYBOARD MECHANISM FOR VOTING MACHINES.
APPLICATION FILED MAY 24, 1917.
1,304,580.
Patented May 27, 1919.
5 SHEETS—SHEET 3.
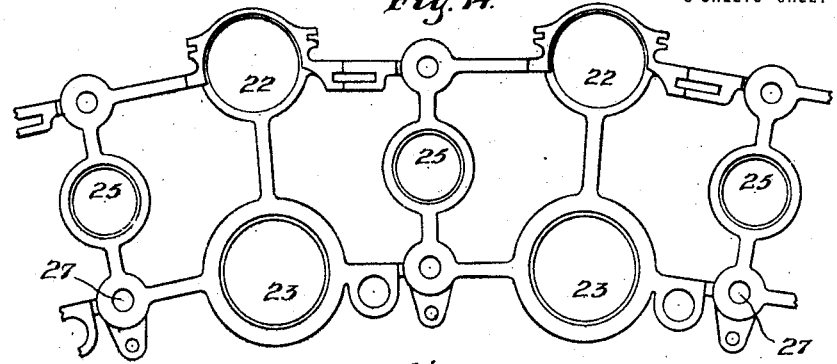
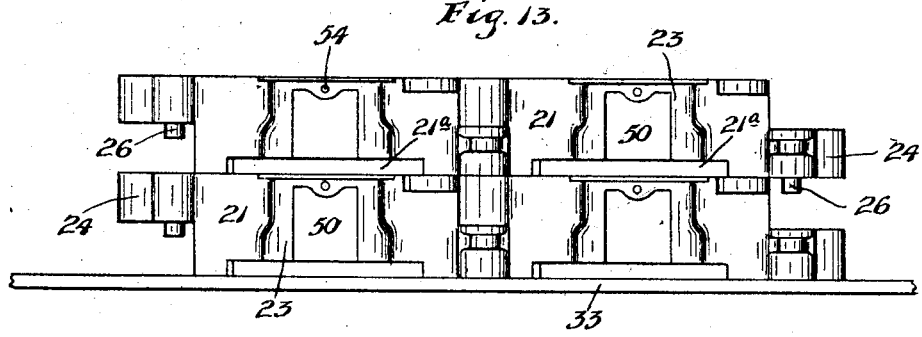
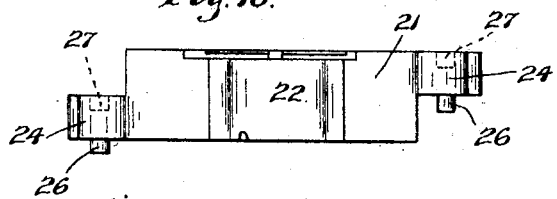
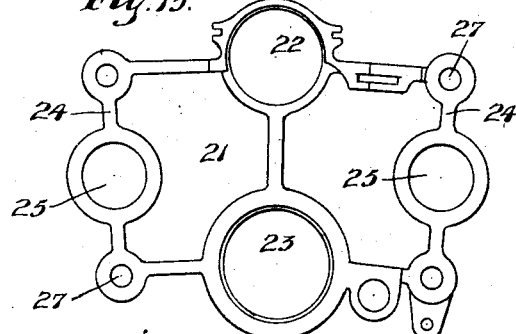
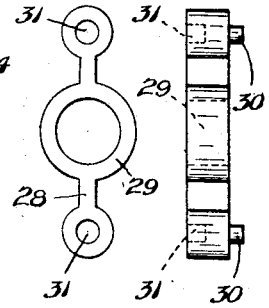
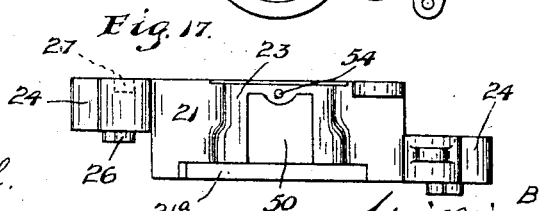
WITNESSES.
H. L. Opsahl.
E. E. Wells
INVENTOR.
SYVER LOE.
BY HIS ATTORNEYS

S. LOE.
KEYBOARD MECHANISM FOR VOTING MACHINES.
APPLICATION FILED MAY 24, 1917.

1,304,580.

Patented May 27, 1919.
5 SHEETS—SHEET 4.

WITNESSES.
H. L. Opsahl.
E. C. Wells

INVENTOR.
SYVER LOE
BY HIS ATTORNEYS.
Williamson & Michael

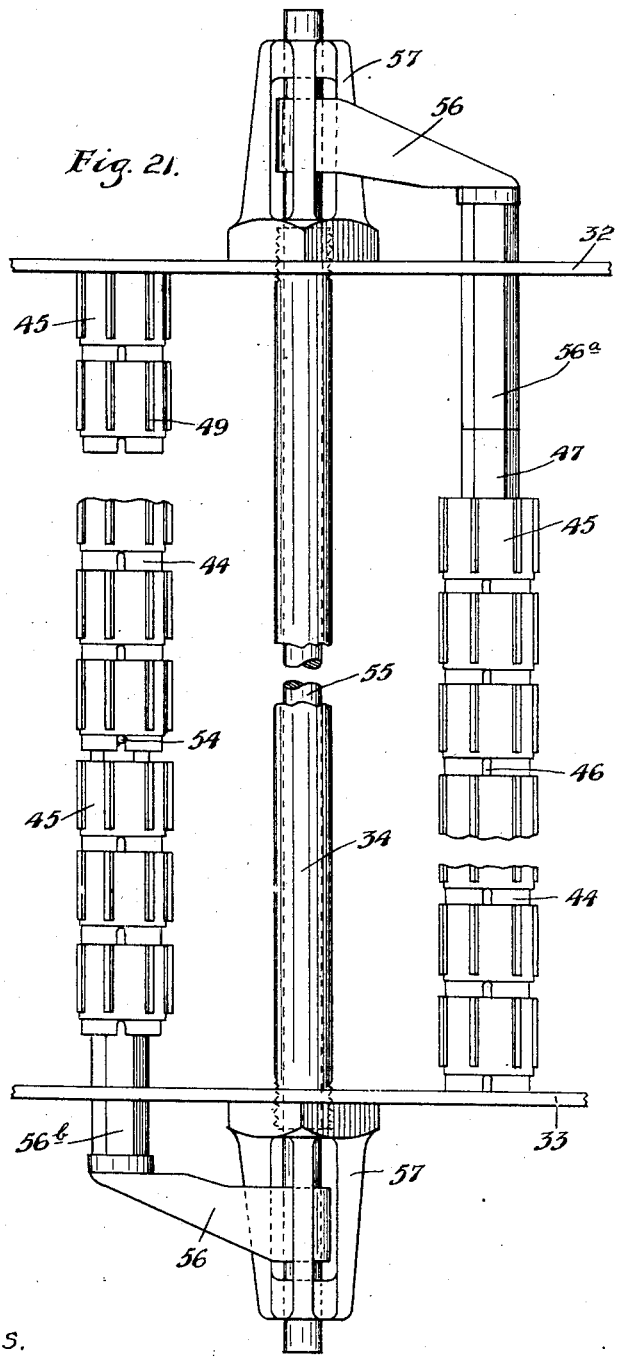

UNITED STATES PATENT OFFICE.

SYVER LOE, OF MINNEAPOLIS, MINNESOTA, ASSIGNOR, BY DIRECT AND MESNE ASSIGNMENTS, TO LOE MULTIPLEX VOTING MACHINE COMPANY, OF MINNEAPOLIS, MINNESOTA, A CORPORATION OF MINNESOTA.

KEYBOARD MECHANISM FOR VOTING-MACHINES.

1,304,580.  Specification of Letters Patent.  Patented May 27, 1919.

Application filed May 24, 1917. Serial No. 170,723.

*To all whom it may concern:*

Be it known that I, SYVER LOE, a citizen of the United States, residing at Minneapolis, in the county of Hennepin and State of Minnesota, have invented certain new and useful Improvements in Keyboard Mechanism for Voting-Machines; and I do hereby declare the following to be a full, clear, and exact description of the invention, such as will enable others skilled in the art to which it appertains to make and use the same.

My invention has for its object to provide an improved keyboard mechanism adapted for use as a part of a voting machine of the general character disclosed and claimed in my prior Patent, 1,039,419 of date, September 24, 1912, entitled "Multiplex voting machine." The present keyboard mechanism, however, is particularly designed for use in connection with the voting machine mechanism disclosed and claimed in my companion application filed of even date herewith, and entitled, "Voting machine."

In the accompanying drawings which illustrate the invention, like characters indicate like parts throughout the several views.

Referring to the drawings:

Figure 1 is a fragmentary view in front elevation showing a portion of the keyboard and its frame work;

Figs. 2, 3, 4, 5, and 6 are plan views of the elements that make up a complete register actuator, said parts being separated;

Figs. 2ª, 3ª, 4ª, 5ª, and 6ª are views in side elevation respectively of the said parts 2, 3, 4, 5, and 6, some parts in Fig. 3 being broken away;

Figs. 7 and 8 are views in elevation with some parts broken away and some parts sectioned, showing respectively the hub, and sleeve members of one of the vote limiting devices;

Fig. 9 is a front elevation with some parts broken away and some parts removed, showing the keyboard mechanism proper;

Fig. 10 is a horizontal section taken approximately on the line 10—10 of Fig. 9;

Fig. 11 is a section taken approximately on the line 11—11 of Fig. 10;

Fig. 12 is a section taken approximately on the line 12—12 of Fig. 10;

Fig. 13 is a detail in front elevation showing several of the interlocking blocks that make up the body of the keyboard;

Fig. 14 is a plan view of parts shown in Fig. 13;

Fig. 15 is a plan view of one of the interlocking skeleton blocks of the keyboard;

Fig. 16 is a rear elevation of the block shown in Fig. 15;

Fig. 17 is a front elevation of the block shown in Fig. 15;

Fig. 18 is a plan view of one of the end filler blocks;

Fig. 19 is a side elevation thereof;

Fig. 21 is a detail in elevation of a device for extension voting.

Figure 20:
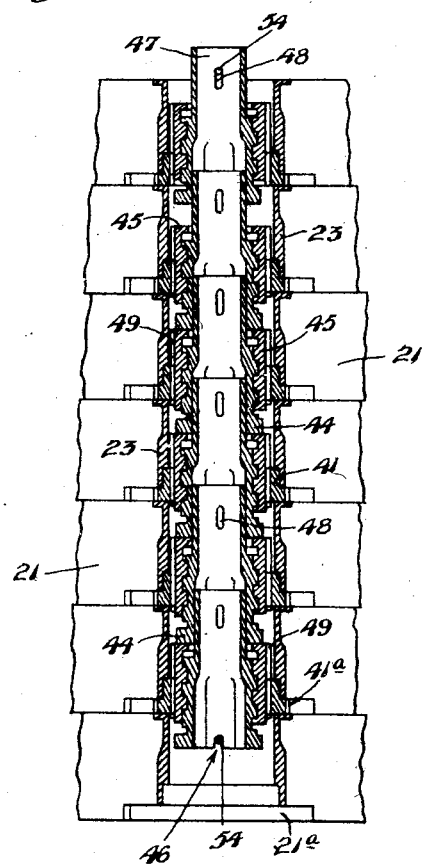
Fig. 20 is a vertical section taken approximately on the line 20—20 of Fig. 10.

The keyboard proper is made up of a multiplicity of interlocking duplicate skeleton blocks or sections constituting in themselves an important feature of this invention. These duplicate interlocking blocks which are preferably cast structures, cast in steel dies and, hence, very accurately formed, are indicated as entireties by the numeral 21, and each thereof is formed with an intermediate front sleeve 22, an intermediate rear sleeve 23, and diagonally opposite reduced ends 24, the latter being formed with sleeves 25. The reduced ends 24 of adjacent blocks are adapted to overlap and each reduced end is provided with a depending dowel lug 26 that enters a dowel pin seat 27 formed in the underlying blocks, thereby securely interlocking the said blocks.

For a multiplex voting machine such as that disclosed in my said prior patent, the said interlocking blocks will be put together to form three independent segmental keyboards, and the gaps at the ends of the end members of said blocks will, preferably, be filled in by filler blocks 28 such as shown in detail in Figs. 18 and 19. These filler blocks 28 have sleeves 29 alined with the sleeves 25 and they are provided with dowel lugs 30 and dowel seats 31 that perform the same function as the said lugs 26 and seats 27 of the blocks 21.

The segmental keyboard formed by the interlocking blocks 21 is adapted to be firmly held together as a unit by means of a clamping frame, as shown, made up of upper plates 32 and lower plates 33 and vertical tie-rods 34. The said tie-rods 34 are preferably tubular and they are passed with a close fit through the alined sleeves 25 of the blocks 21. Nuts 35 in the upper and lower ends of the tie-rods 34 rigidly clamp the upper and lower plates 32 and 33 onto the upper and lower blocks 21 and thus firmly unite the whole group of interlocking blocks. Of course, when the rods 34 are removed, the interlocking blocks 21 may be readily separated.

In the complete voting machine, an upper frame 36 will be secured on the upper plate 32 and certain other mechanism, not necessary here to consider, will be applied in this upper frame. In Fig. 1 the voters' operating crank 37 and a signaling arm 38 are shown, but these parts need not be here considered inasmuch as they are more fully disclosed and claimed in my companion application above identified.

Each register actuator (see particularly Figs. 1 to 6ª and Fig. 10) is made up of a finger actuating lever or key 39, a register actuating lever 40, an adjusting collar 41, a hub 42, and preferably, but not necessarily, of an independent vote, so called, lock washer 43.

The vote limiting mechanism is a modification of, or improvement on, that disclosed and claimed in my prior Patent, No. 712,079, of date, October 28, 1902, entitled, "Voting machine." Each expansible element of said vote limiting mechanism comprises an externally threaded hub 44 and internally threaded sleeve member 45. The hub members 44 at their lower edges have projecting flanges formed with diametrically opposite notches 46, and at their upper ends they are formed with projecting angular shanks 47 that have longitudinal slots 48. The sleeve members 45 have circumferentially spaced longitudinal external ribs 49 that engage, but slide, through internal notches 49ª of the so-called adjusting collars 41 which latter surround the same when the parts are assembled, as shown in Figs. 9, 10, and 11. The hubs 44 are made hollow and formed with angular interiors into which the angular shanks 47 of underlying hubs are telescoped, so that when one of the hubs is locked against rotation, all of the hubs of that collar will also be locked against rotation but the several hubs will be free for vertical sliding movements, one upon the other. The means for thus anchoring these hubs against rotation and for limiting the expanding movements thereof, will be considered a little later on.

As noted, one of the adjusting collars 41 works on each external sleeve 45. One of the register actuating levers 40 is mounted on each collar 41, and each such lever is provided with an overturned end 40ª that has a segmental serrated inner end that adjustably interlocks with a serrated flange 41ª on the exterior of the said collar 41. Thus by sliding vertical movement, the lever 40 may be set circumferentially in any adjustment on the collar 41 that may be desired. Each lever 40 has an arm with a slot 40ᵇ in which works a cam pin 39ª carried by a projecting arm of the finger actuated lever 39 so that by movement of said lever 39 from its normal position, shown at the left in Fig. 10, into its set position, shown at the right in Fig. 10, the projecting end of the said lever 40 may be moved from its inoperative position into an operative position for action on a corresponding register, all as more clearly disclosed in my said prior Patent, No. 1,039,419.

The sleeves 45 of the vote limiting devices are mounted to work in the inner sleeves 23 of the respective blocks 21 and their ribs 49 quite closely engage the interiors thereof so that the said sleeves form the pivots on which the levers 40 oscillate. Said sleeves 45, however, are free for vertical sliding movements within the sleeves 23. The backs of the sleeves 23 are cut away at 50 (see Figs. 9, 13, and 17) so that access can be had to the sleeves 45 to adjust the same, and the lower intermediate portions of said blocks are cut away at 21ª to afford clearance for movements of the levers 40 and also to afford clearance for the adjusting collar 41.

The hubs 42 are provided near their upper ends with outstanding flanges that merge into a radially projecting lug 42ª. These hubs 42 are rotatively mounted in the front sleeves 22 of the respective blocks 21 and their upper flanges and projecting lug 42ª work in reduced upper edge portions of said front sleeves. The finger actuated levers 39 are rotatatively mounted on the extreme upper end portions of the hubs 42 and rest on the flange thereof and work through slightly reduced or lowered front edge surfaces formed in the front sides of the said front sleeves 22 so that the front ends of the said levers 39 project beyond the face of the keyboard where they may be engaged by the fingers. The said levers 39 are provided with outstanding portions that are formed with downturned lugs 39ᵇ that are adapted to be engaged with the lugs 42ª of the respective hubs 42 under conditions hereinafter noted. (See particularly Figs. 5 and 5ª.)

The hubs 42 are formed with angular axial passages and corresponding angular resetting shafts 51 are passed vertically therethrough. These shafts 51 at their extreme upper ends and just above the upper plates 32 are provided with pinions 52 that are engaged by racks (not shown) but which are operated by means, or in the manner more fully disclosed in my prior application entitled "Voting machine" and above referred to. In Fig. 12, numeral 53 indicates a bushing applied around the hub 42 to keep the same centered in respect to the sleeve 22 in which it is mounted to rotate.

The so-called lock washers 43 are interposed between the hubs 45 and are located one directly on top of each lever 39. These lock washers 43 have elongated angular openings that closely fit the angular shaft 51 on two sides, but are capable of sliding thereon, but must always rotate with the said shafts. Each such washer 43 has a lug 43ª that is engageable with a notch 43ᵇ formed in the lever 39. Normally, the lock washers 43 are set so that their lugs 43ª do not engage with the notches 43ᵇ of the levers 39 and hence, normally, the machine will operate just as if the said washers were not provided.

When the machine is set for an election, the register actuators and the expansible vote limiting devices will be separated into groups and the expansion of each group of expansible devices will be limited by suitable stops. These stops are preferably in the form of stop pins 54 which are passed through perforations in certain of the blocks 21 and through the alined lower end notches 46 of the lower hub of the group, and through the alined slot 48 of the upper hub of the group, as best shown in Fig. 20. In Fig. 20, the group is shown as adjusted to vote for two candidates where two political parties are represented and where there are two extra actuators and expansible devices for the two possible independent votes, making a group of six actuators and six expansible vote limiting devices.

In this adjustment of the group there is sufficient play between the expansible vote limiting devices to permit two actuators, and only two, to be moved from normal to set positions, and the movement of two keys or actuators will take up all the slack in the group, and the stop pins 54 will then become effective to prevent a third key of that group from being operated.

In the position of the parts shown at the left in Fig. 10, the lugs 42ª of the hubs 42 are against the depending lugs 39ᵇ of the levers 39, and the actuators are then locked in normal positions. Before the actuators can be released for operation, the shaft 51 must be moved so as to carry the lugs 42ª into the position shown at the right in Fig. 10. When the lugs 42ª are at the position shown at the right in Fig. 10, the actuators are released and may then be set, in any desired order, subject only to the control of the vote limiting mechanism. To simultaneously restore the set actuators to normal positions, the shafts 51 are simultaneously oscillated by means disclosed in my said companion application, entitled, "Voting machine" so as to move the lugs 42ª from the position shown at the right in Fig. 10, back into the position shown at the left in Fig. 10.

Assuming now that the voter desires to cast two independent votes for the office to which the group shown in Fig. 20 is assigned, but for parties not represented on the ticket; assume also the two lowermost actuators are assigned to independent votes for that group. In this case, he notifies the judge of his intention, and the judge will then move the two lower actuators for that group into set positions, thereby taking up all the slack in the group of expansible devices so that no further actuators of that group can be operated by the voter, and then by a suitable instrument, such as a blade, pushes the lock washers 43 of the two lower actuators inward or backward so that their lugs 43ª will engage the notches 43ᵇ of the levers 39 (see Figs. 5, 6, and 10) and thereby locks the two independent vote actuators to the corresponding shaft 51 and in their set positions. The judge then hands the voter two cards or disks upon which he may write the name of the person for whom he desires to vote and also the office to which he desires him elected and which in the assumed instance is in the office to which the group Fig. 20 is assigned. The voter will then drop his written ballots into a suitable box, not shown. Here it should be noted (see Fig. 4ª) that the hubs 42 are provided in their upper ends with clearance notches 42ᵇ by which notches 43ª may be moved into and out of engagement with the notch 43ᵇ. It will also be noted that the slotted arm of the lever 40 is provided with a cam lug 40ᶜ which, when the actuator is moved from its set position, shown at the right, into its normal position, shown at the left in Fig. 10, engages the inner end of the corresponding lock washer 43 and forces the same outward and back to its normal or inoperative position.

Fig. 21 illustrates a device for extension voting, that is for voting for a number of candidates for the same office where the number of candidates represented is so great that it cannot be taken care of in one column, or where for other reason it must be extended from the one column into an adjacent column; for example, suppose that it is possible to vote for six judges at an election where there are four political parties represented, making a total of twenty-four candidates to be represented in the column, and for whom it is possible to vote to the extent of six, but no more.

The plan on which the extensible screw-threaded elements expand between stops to limit the number of possible votes to be cast for a candidate in a group has already been described. To carry this expanding action from one column to the other, an upright rod 55 is extended through one of the tubular columns 34 that is between adjacent columns of the expansible vote limiting devices. At its upper and lower ends, the rod 55 is provided with radially projecting arms 56 that work through openings in head brackets 57 secured to the upper and lower plates 32 and 33 respectively. The end of the arm 56 has a depending stem 56ª that works through the top plate 32 and engages the extended sleeve 47 of the uppermost hub 44 of the one column of expansible elements; and the end of the lower arm 56 has an upwardly extended stem 56ᵇ that works through the lower plate 33 and engages the hub 44 of the lowermost expansible element of the adjacent column of both limiting devices. The external sleeve member 45 of the lefthand column of expansible elements, as shown in Fig. 21, reacts against the upper plate 32 while the hub of the lowermost expansible element of the righthand column re-acts against the lower plate 33. The expansible devices will be so set that the play between the same will permit just the proper number of register actuators to be moved before this play is taken up. After all the play is taken up in the lefthand column, for example, then the downward movement imparted to the rod 55 and heads 56, acting through the stems 56ª and 56ᵇ, will take up all of the play in the righthand column of actuators, thereby preventing movement of any further actuators from normal position. The reverse of the above statement is also true. Assuming it is possible to vote for six and that three of the expansible vote limiting devices in the lefthand column are operated by setting of corresponding actuators, then there will still be left in the righthand column of expansible devices, sufficient play to permit three of the vote limiting devices therein to be expanded by manipulation of the corresponding register actuators; but when six expansible devices have ben expanded in the one way or the other, either in one of the columns or the other, or partly in both of the columns, then it will be impossible to set any further actuators of the group.

What I claim is:

1. The combination with upper and lower plates and vertical tie-rods connecting the same, of a keyboard frame made up of a multiplicity of interconnecting blocks having sleeves through which the said rods are passed, and register actuators mounted in said blocks and projecting therefrom, said blocks at their adjoining edges having clearance passages for the said register actuators.

2. In a voting machine, the combination with upper and lower plates and tie-rods connecting the same, of a keyboard frame made up of a multiplicity of duplicate, interlocking, skeleton blocks, said blocks at their ends having reduced and overlapped ends formed with the sleeves through which said tie-rods are passed, the said blocks at their intermediate portions having inner and outer sleeves, and register actuators comprising inner and outer interconnected levers and expansible vote limiting devices, said latter being mounted in the inner sleeves of said blocks, and the said inner levers being connected thereon, the said outer levers being pivotally mounted at the outer sleeves of said blocks and projecting therefrom.

3. The combination with a keyboard frame made up of a multiplicity of interconnected, interchangeable, skeleton blocks, said blocks having inner and outer sleeves at their intermediate portions, of expansible vote limiting devices comprising internally and externally threaded members, the latter being mounted for rotary and axial movements within the inner sleeves of said blocks, resetting shafts extended through the outer sleeves of said blocks, provided with hubs rotatable therewith, register actuators comprising connected inner and outer levers, the latter being rotatable with the external members of said vote limiting devices, the said outer levers being pivoted on the hubs of said resetting shafts and capable of independent movements from normal to set positions, and means whereby the set actuators will be restored to normal positions by rotation of said resetting shafts.

4. The combination with a keyboard frame made up of a multiplicity of interconnected, interchangeable, skeleton blocks, said blocks having inner and outer sleeves at their intermediate portions, of expansible vote limiting devices comprising internally and externally threaded members, the latter being mounted for rotary and axial movements within the inner sleeves of said blocks, resetting shafts extended through the outer sleeves of said blocks, provided with hubs rotatable therewith, register actuators comprising connected inner and outer levers, the latter being rotatable with the external members of said vote limiting devices, the said outer levers being pivoted on the hubs of said resetting shafts and capable of independent movements from normal to set positions, means whereby the set actuators will be restored to normal positions by rotation of said resetting shafts, and lock washers normally inoperative but adapted to be moved to lock said actuator levers to said resetting shafts and in normal positions.

5. In a voting machine, the combination with the keyboard frame and oscillatory resetting shafts mounted therein, of register actuators comprising levers pivoted in respect to said resetting shafts, and lock devices normally inoperative but adapted to be moved to lock said levers to said resetting shafts and in normal positions.

6. In a voting machine, the combination with independently operatable register actuators, of individual lock devices whereby, at will, any one of said actuators may be locked in its normal position without interfering with the action of any other actuator.

7. In a voting machine, the combination with independently operatable register actuators, of individual lock devices whereby, at will, any one of said actuators may be locked in its normal position without interfering with the action of any other actuator, and vote limiting devices coöperating with said actuators.

8. In a voting machine, the combination with a keyboard frame made up of superimposed and interconnected blocks, of vote limiting devices mounted in the respective blocks, each vote limiting device comprising internally and externally threaded members, the latter having angular stems telescoped into the externally threaded members of adjacent vote limiting devices.

9. In a voting machine, the combination with a keyboard frame made up of superimposed and interconnected blocks, of vote limiting devices mounted in the respective blocks, each vote limiting device comprising internally and externally threaded members, the latter having angular stems telescoped into the externally threaded members of adjacent vote limiting devices, the said stems having perforations, and lock pins insertible through certain of the said slots and through seats in the said frame to connect said vote limiting devices in groups and to limit the expansion of the group.

10. In a voting machine, a stack of expansible vote limiting devices made of internally and externally threaded members, the latter having telescoped angular portions.

11. In a voting machine, the combination with adjacent stacks of expansible vote limiting devices, of a device for extension voting comprising a vertically movable rod having at its opposite ends projecting portions serving as abutments to limit the expansion of the two stacks of vote limiting devices in opposite directions.

12. In a voting machine, the combination with two stacks of expansible vote limiting devices made up of internally and externally threaded devices, of a device for extension voting comprising a vertically movable rod having projecting arms at its upper and lower ends, the said upper arm having an abutment serving to limit the upward expansion of the one column of vote limiting devices, and the lower arm having an abutment serving to limit the downward expansion of the other column of vote limiting devices.

In testimony whereof I affix my signature in presence of two witnesses.

SYVER LOE.

Witnesses:
 CLARA DEMAREST,
 BERNICE G. WHEELER.

Copies of this patent may be obtained for five cents each, by addressing the "Commissioner of Patents, Washington, D. C."